J. W. YOUNG.
METHOD OF SEALING ENDS OF RUBBER HOSE.
APPLICATION FILED OCT. 12, 1917.
1,282,160. Patented Oct. 22, 1918.
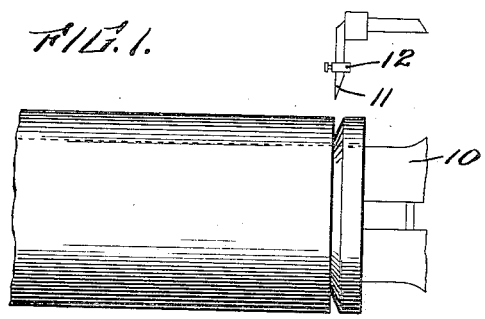
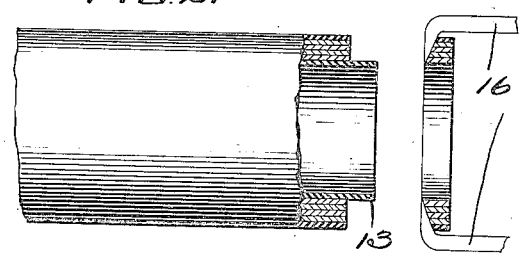
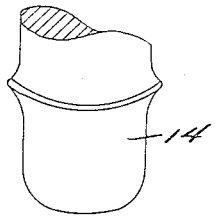
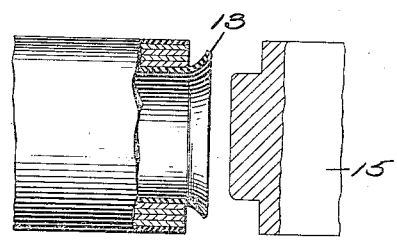
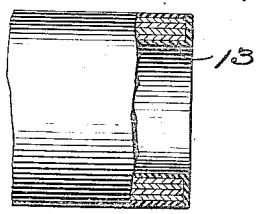
Inventor.
John W. Young,
By C. S. Landon
his Attorney.

UNITED STATES PATENT OFFICE.

JOHN W. YOUNG, OF AKRON, OHIO, ASSIGNOR TO THE GOODYEAR TIRE & RUBBER COMPANY, OF AKRON, OHIO, A CORPORATION OF OHIO.

METHOD OF SEALING ENDS OF RUBBER HOSE.

1,282,160.

Specification of Letters Patent.

Patented Oct. 22, 1918.

Application filed October 12, 1917. Serial No. 196,211.

*To all whom it may concern:*

Be it known that I, JOHN W. YOUNG, a citizen of the United States, residing at Akron, in the county of Summit and State of Ohio, have invented new and useful Improvements in Methods of Sealing Ends of Rubber Hose, of which the following is a specification.

My present invention relates to improvements in hose capping or sealing processes and more particularly to capping or sealing hose lengths after they have been cured and cut up into sections.

In the manufacture of rubber hose it is customary to build up the hose in predetermined lengths and, after curing, to cut up into desired lengths for the market. This leaves the cut ends of the hose unprotected and easily accessible to water, moisture, etc. It is the custom of some manufacturers to cap the ends of the tube prior to curing, but even then it becomes necessary after curing to cut the cured hose into market lengths and to then provide a means for sealing the ends of the newly cut lengths.

The principal object of my invention is to provide a cheap and effective method of forming a terminal cap or closure on a length of hose cut from a longer section of hose after such section of hose has been completely cured and ready for the market.

The above and additional objects of a similar nature, which will be hereinafter more specifically treated, may be accomplished by such means as are illustrated in the accompanying drawings, described in the following specification and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Figure 1 illustrates the end of a section of hose, showing in diagrammatic form a clamping or retaining means and also a cutting means;

Fig. 2 is a similar view illustrating the next step after cutting;

Fig. 3 illustrates the next step in the method, showing in diagrammatic form the spreading mandrel;

Fig. 4 illustrates the next step, also showing in diagrammatic form the curing mandrel; and Fig. 5 is a sectional view of the finished product.

In carrying out my invention, I provide an expansible chuck 10 which is readily insertible into the end of the hose section and adapted to expand and tightly grip the inner walls of the rubber lining and securely hold same in position and rotate the hose while the cutting knife 11 is brought into engagement. The cutting knife 11 has mounted on it a stop gage 12, which is adjustable in a manner to prevent the knife from severing more than the outer layer of rubber and the interposed layers of rubberized fabric.

When the knife is brought into position the mandrel is slowly revolved and the knife cuts through the outer layers of the hose down to the inner tube of rubber 13.

Any suitable means 16 is then provided for stripping the cut layers of rubber and fabric off from the inner tube of rubber, in the manner clearly shown in Fig. 2.

The expansible chuck 10 is then withdrawn and the outer surface of the inner tube 13 and the cut ends of the fabric are thoroughly cemented with one or more coats of a good rubber cement. This is allowed to dry and set and the flaring or turning mandrel 14 is then inserted into the end of the hose, gradually forcing the inner tube of rubber outwardly until it has assumed the position of an angle less than 180 degrees as shown in Fig. 4.

Another mandrel formed with an annular shoulder 15 is then inserted into the ends of the hose and forced inwardly until said shoulder presses against the previously outwardly turned inner tube of rubber so that said inner tube is firmly cemented against the severed end of the fabric plies and outer tube. It is held in this position until the cement has thoroughly dried and set and it is then withdrawn and the seal is complete as clearly shown in Fig. 5.

It is found in some cases where the hose is to be used for special purposes, as in the case of acid, steam, etc., that it becomes necessary to form the seal by vulcanization. For this purpose, the mandrel 15 may be heated by any suitable means so that sufficient heat will be transferred from the mandrel 15 to the end of the hose to cause vulcanization of the seal.

From the foregoing it will be readily seen that with my improved method, I have made possible the speedy and effective sealing of the ends of rubber hose, and although I have described one particular set of tools for performing the method, I do not wish to be limited to this particular construction shown, it being obvious that other types of tools may be employed to obtain all the advantages of the method without departing in any way from the spirit or scope of the invention.

What I claim is:

1. The method of forming a closure for the end of a section of rubber hose cut from a length of already cured rubber hose made of a plurality of plies of fabric and an inner tube of rubber, which consists of cutting the layers of fabric from the end portion of the section of rubber hose, applying a coat of adhesive material to the cut ends of the fabric, turning the projecting inner tube of rubber outwardly at an angle less than 180 degrees, and then firmly pressing the outwardly turned inner tube of rubber against the adhesive coating until the same has set.

2. The method of forming a closure for the end of a section of rubber hose cut from a length of already cured rubber hose which comprises an outer rubber cover, a plurality of fabric plies, and an inner tube of rubber, which consists of cutting the plies of fabric and the outer covering of rubber off from the end portion of the section of rubber hose, applying a coat of vulcanizable material to the cut ends of the fabric and outer layer of rubber, turning the projecting inner layer of rubber outwardly to an angle less than 180 degrees, and inserting a vulcanizing means into the end of the hose to cause a vulcanization between the outwardly turned tube of rubber and the cut ends of the fabric plies and outer casing of rubber, substantially as set forth.

In testimony whereof, I have signed my name in the presence of a subscribing witness.

JOHN W. YOUNG.

Witness:
J. E. K. EATING.